May 12, 1959
J. M. HUNT
2,886,244
FUNCTION GENERATOR EMPLOYING MULTIPLE POTENTIOMETERS
Filed Aug. 27, 1954
6 Sheets-Sheet 2
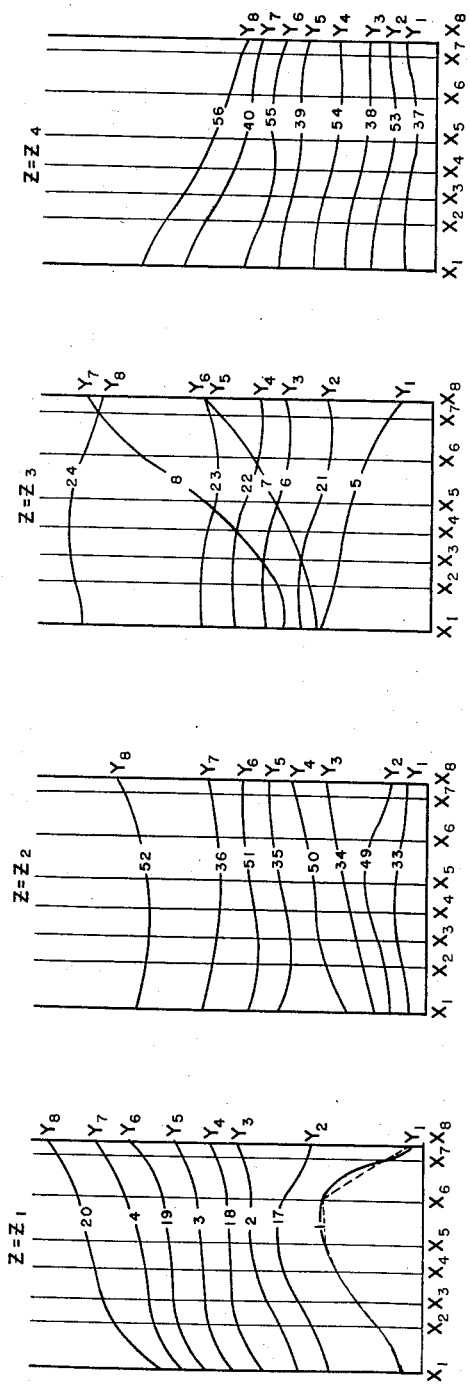
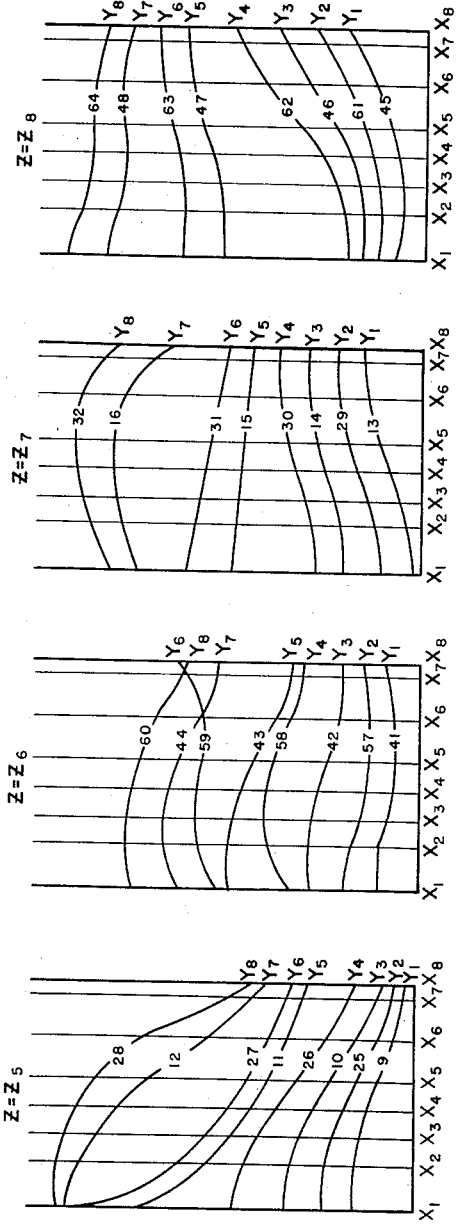
FIG. 2
JOHN M. HUNT
INVENTOR
BY *Richard D. Stephens*
ATTORNEY May 12, 1959 J. M. HUNT 2,886,244
FUNCTION GENERATOR EMPLOYING MULTIPLE POTENTIOMETERS
Filed Aug. 27, 1954 6 Sheets-Sheet 3

JOHN M. HUNT
INVENTOR

BY Richard G. Stephens
ATTORNEY

May 12, 1959  J. M. HUNT  2,886,244
FUNCTION GENERATOR EMPLOYING MULTIPLE POTENTIOMETERS
Filed Aug. 27, 1954  6 Sheets-Sheet 4

JOHN M. HUNT
INVENTOR

BY Richard D. Stephens
ATTORNEY

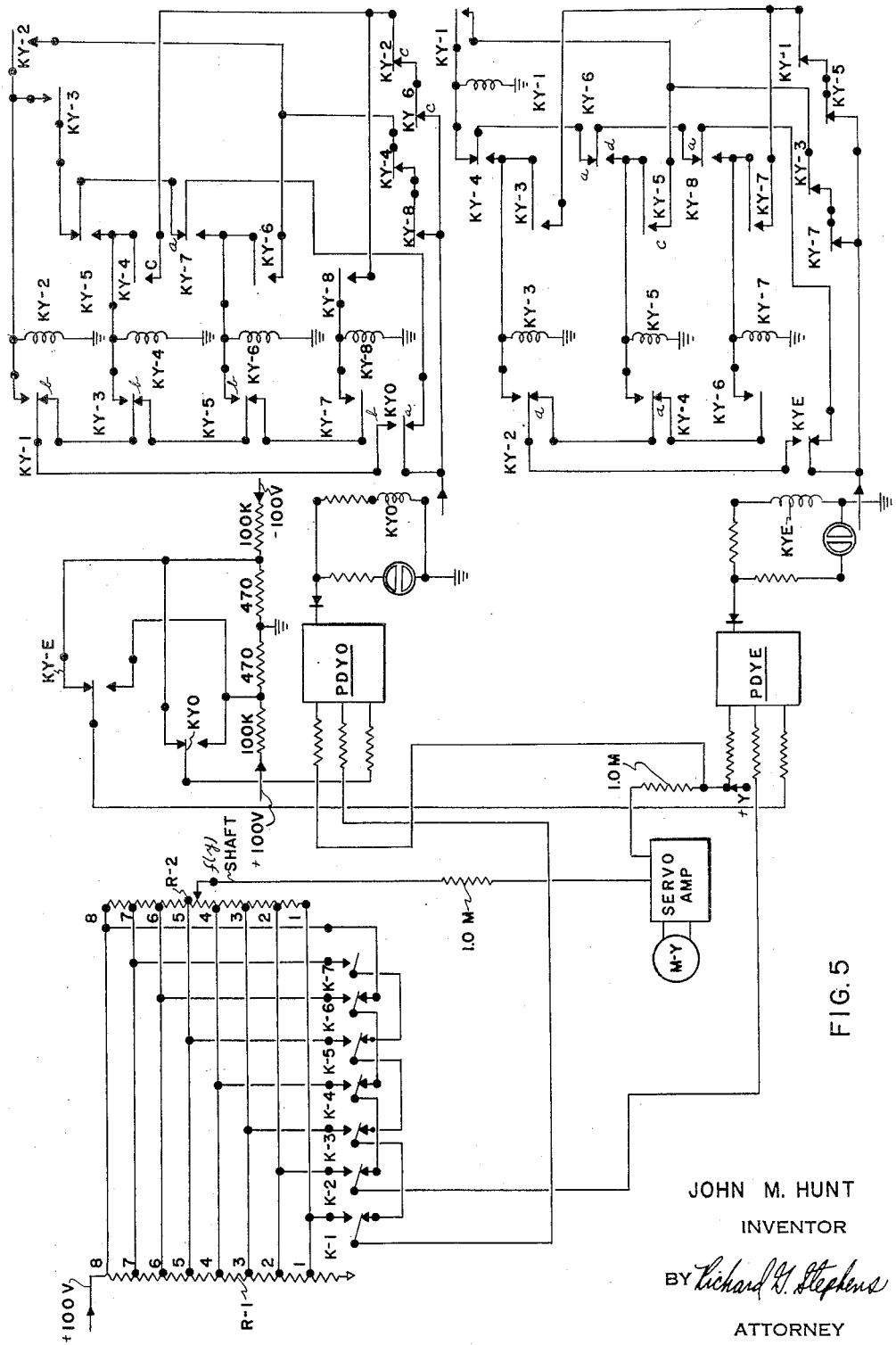

May 12, 1959 J. M. HUNT 2,886,244
FUNCTION GENERATOR EMPLOYING MULTIPLE POTENTIOMETERS
Filed Aug. 27, 1954 6 Sheets-Sheet 6
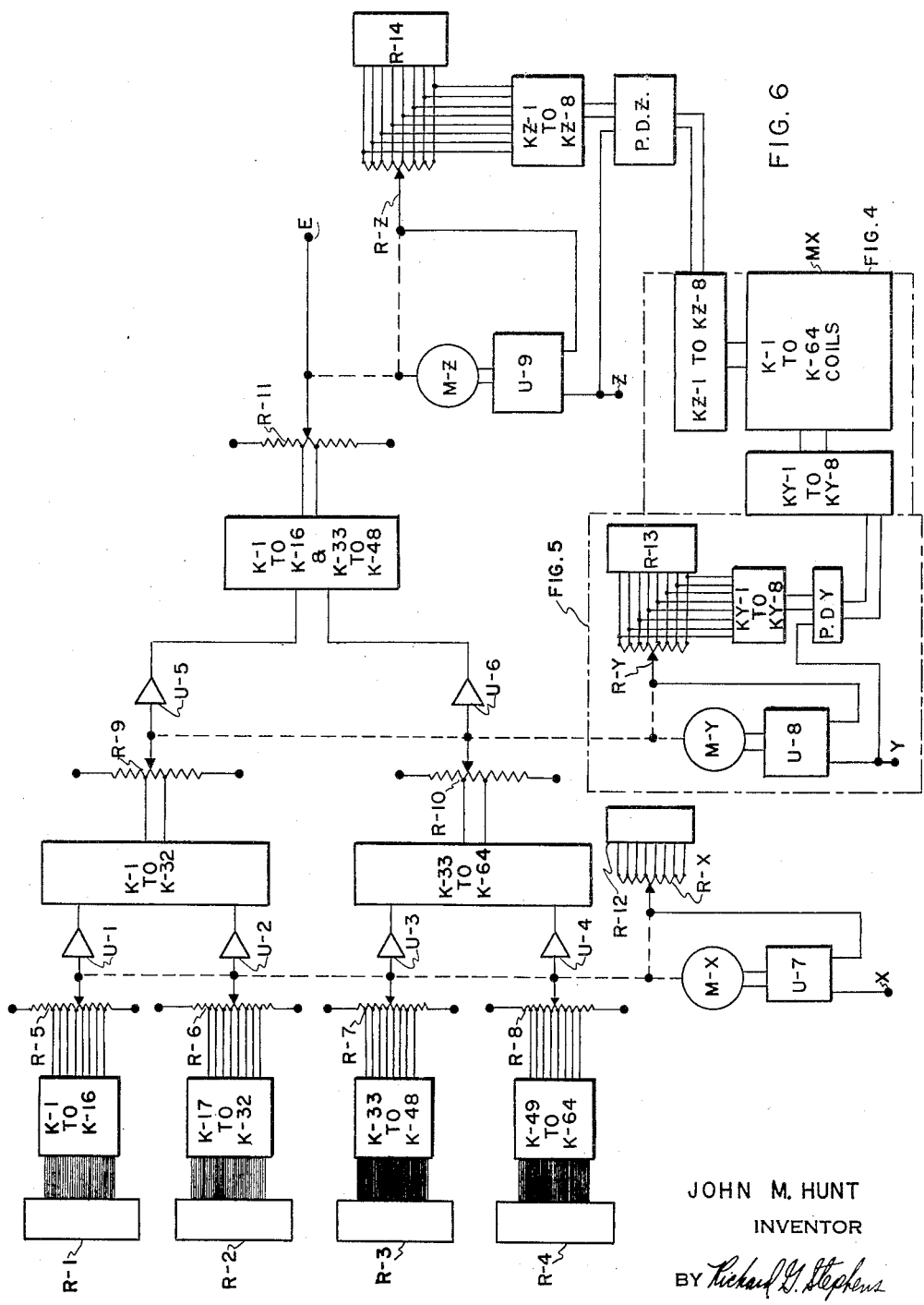
JOHN M. HUNT
INVENTOR
BY Richard G. Stephens
ATTORNEY

United States Patent Office 2,886,244
Patented May 12, 1959

2,886,244

FUNCTION GENERATOR EMPLOYING MULTIPLE POTENTIOMETERS

John M. Hunt, Binghamton, N.Y., assignor to Link Aviation, Inc., Binghamton, N.Y., a corporation of New York Application August 27, 1954, Serial No. 452,681

15 Claims. (Cl. 235—197)

My invention relates to a device which generates an output potential proportional to functions of one or more independent variables. In the scientific world many physical relationships which defy exact mathematical expression are expressed by means of curves, graphs or tables plotted tr tabulated from data derived from actual measurement. As an example, jet engine thrust may be expressed as an empirical function of Mach number of flight, altitude of flight and engine speed. As another example, the rate at which a particular chemical reaction takes place may be expressed as a function of pressure, temperature and the weight ratio between two combining substances. Other well-known examples of empirical data which defy reduction to convenient mathematical expression are pentode vacuum tube curves. In a pentode, plate current may be said to be a function of plate voltage, control grid voltage and screen grid voltage if all other tube conditions are held constant. Since these functions are too complicated to be conveniently and accurately expressed in mathematical terms, plate current is usually determined by reference to charts which have been plotted from actual test data. In the scientific arts generally, and particularly in the analogue computer, automatic control and instrumentation arts, it often becomes desirable to provide an output potential as a function of a plurality of variables in accordance with empirical or tabulated data for use in computing, control, or indication. In addition, some physical phenomena which may be expressed mathematically with exactitude result in such complex mathematical expressions that analogue mechanization of such expressions would be practically prohibitive. In many cases, these phenomena may be expressed conveniently by empirical data.

A quantity which is a function of one independent variable may be expressed by one curve. A quantity which is expressed as an empirical function of two independent variables may be expressed by a family of curves, in which each curve is obtained by maintaining one independent variable constant at particular values while the other independent variable is continuously varied. A quantity which is expressed as an empirical function of three variables results in groups of families of curves. It will be apparent that in order to determine the output quantity for a value in between two of the values at which the one independent variable was held constant, that one must interpolate between two curves. Since many physical phenomena may be conveniently expressed as empirical functions of a plurality of variables, it therefor becomes desirable to provide a means by which an output control quantity such as a voltage may be provided as an empirical function of a plurality of independent variables in which interpolation between empirical or measured values is accomplished simply and rapidly.

It is therefore an object of my invention to provide improved function generating apparatus capable of producing an output potential as a function of three independent variable input quantities.

It is another object of the invention to provide improved function generating apparatus in which linear interpolation between discrete values of a plurality of independent variables is provided in which a novel switching system is employed to compare the value of the independent variables with predetermined discrete values.

It is a further object of the invention to provide improved voltage function generating and interpolating apparatus in which standard parts are utilized.

It is an additional object of the invention to provide improved function generating apparatus adjustable to any continuous function in which a minimum amount of re-iterative adjustment is required.

Other objects of the invention will in part be obvious and will in part appear hereinafter.

The invention accordingly comprises the features of construction, combinations of elements and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 2 illustrates the nature of the data which may be reproduced in electrical form by a three-independent variable form of my invention;

Fig. 5 is an electrical schematic diagram showing the switching matrix actuating circuits for one sector control relay system of the invention. Two circuits such as that of Fig. 5 are required to actuate the matrix of Fig. 4;

Fig. 6 is an electrical schematic diagram partially in block diagram form showing an arrangement of the complete apparatus of a three-variable form of my invention.

Referring in greater detail to Fig. 2 there is shown an example of the data which may be reproduced in electrical form by a three-variable form of the invention. Although a three-variable version of the invention will be illustrated and described in detail, it will become apparent that my invention is quite as applicable to problems wherein quantities are expressed in greater or lesser numbers of variables from empirical or tabulated data. It will be seen that the basic data consist of eight groups of curves, one group for each of eight discrete values of the Z variable ($Z_1$ to $Z_8$). Each individual group consists of one curve for each of eight discrete values of the Y variable ($Y_1$ to $Y_8$). On the individual curves, the value of the output quantity is specified continuously with respect to the value of the X variable. Thus the data provides 64 curves relating information on the value of the output quantity for continuous variation of the X variable at eight discrete values of the variables Y and Z. Although the number of finite increments of the Y and Z variables has been illustrated as eight, a greater or lesser number of finite increments may be employed, and it is not at all necessary that the number of Y increments equal the number of Z increments. It will become apparent, however, as the description proceeds, that the complexity of the resultant circuitry will be dependent upon the number of Y and Z increments (i.e., upon the number of individual curves to be generated).

Figure 1:
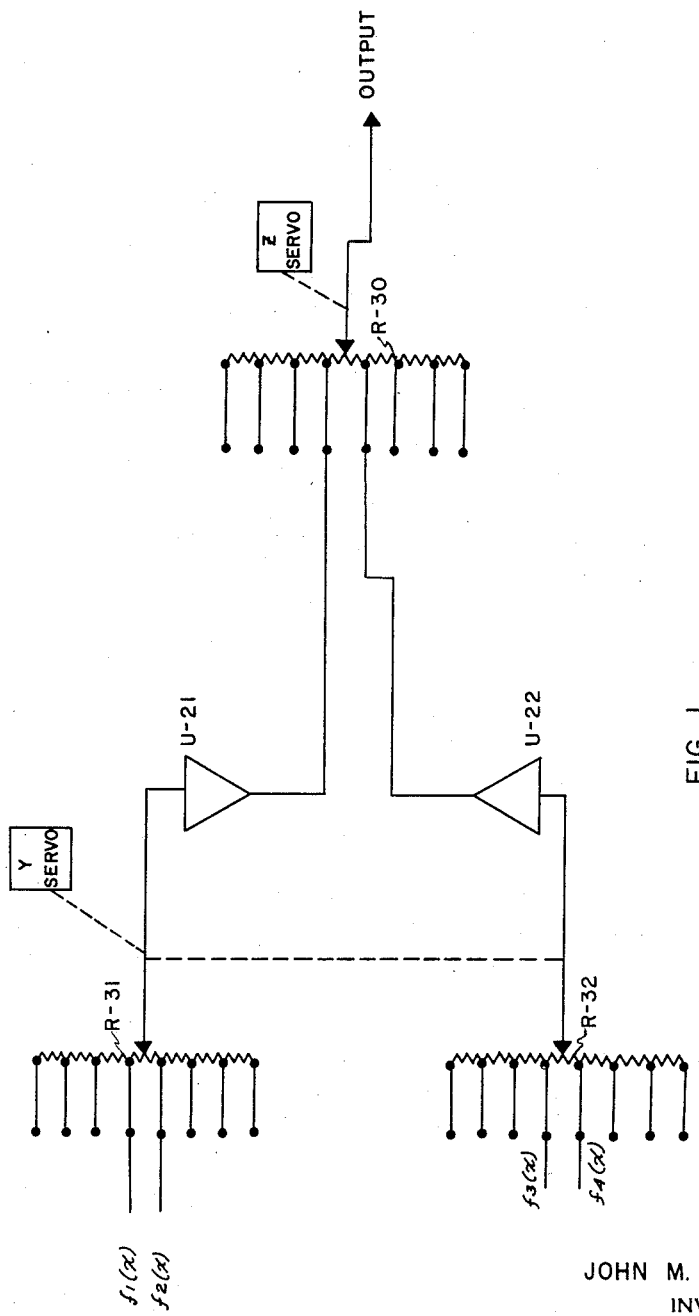
Fig. 1 is an electrical schematic diagram showing the basic connections of an elementary interpolator, as an aid in understanding the principles of my invention.

Referring to Fig. 1 there is shown a simplified interpolator. The output of the interpolator is taken from the slider or wiper of potentiometer R–30. The shaft of potentiometer R–30 is positioned by a conventional position servo to a position commensurate with the value of the Z variable. Potentiometer R–30 has a number of taps (including the end terminal connections) equal to the number of discrete values of the Z variable. Hence in mechanizing the data of Fig. 2, potentiometer R–30 will have eight fixed connections to its winding. Each tap is located at the position on potentiometer R–30 corresponding to the value of a particular Z increment. For convenience in understanding the invention, the taps may be numbered according to the value of the Z variable. For example, when Z is equal to $Z_4$ of Fig. 2, the slider of potentiometer R–30 is exactly opposite or contacting tap number 4.

In Fig. 1 it may be seen that two adjacent tap locations are excited by the output voltages of two individual feedback amplifiers U–21 and U–22. The feedback amplifiers utilized in practising my invention are preferably of the "summing amplifier" type conventionally used in analogue computation. Such amplifiers have high input impedance, high loop gain, an output voltage gain of approximately "one," and are provided with compensating networks to prevent oscillation over any part of the frequency spectrum. Having high input impedance, the feedback amplifiers serve to isolate each stage from each other, and hence prevent errors in the output quantity due to loading the voltage dividers or the potentiometers. It will be apparent that other high input impedance or "buffer" devices such as cathode followers, for example, may be substituted.

In the operation of the invention, the outputs of the two amplifiers U–21 and U–22 are always connected by a relay control matrix to the two adjacent tap locations on either side of the instantaneous position of the slider of potentiometer R–30. Thus, if the slider of potentiometer R–30 in Fig. 1 moves downwardly to a position below the tap driven by amplifier U–22, the relay switching circuitry (described below) will disconnect amplifier U–21 from the tap indicated in Fig. 1 and will connect it to the tap immediately below that driven by amplifier U–22. The connection to amplifier U–22 will not be switched at such a time. It will be seen that the output voltage at the slider of the potentiometer R–30 may be a linear interpolation between the known values of the function for two adjacent finite increments of the Z variable. In order to accomplish such interpolation, it will be necessary that the outputs of amplifiers U–21 and U–22 represent the desired values of the function at the two adjacent finite increments of the Z variable.

Providing the input signals to amplifiers U–21 and U–22 are potentiometers R–31 and R–32, which are identical, are mechanically ganged to one another, and which are positioned by a servo to a position commensurate with the value of the Y variable. Similarly to potentiometer R–30, these latter two potentiometers are tapped at locations corresponding to finite increments of the Y variable. In mechanizing the data of Fig. 1, potentiometers R–31 and R–32 will each have eight fixed connections, since there are eight specified discrete values of the Y variable (eight Y curves per family). The input voltages to potentiometers R–31 and R–32 are connected by the relay matrix to be described to the pair of taps adjacent the potentiometer sliders, in a manner similar to that explained in connection with potentiometer R–30, and hence linear interpolation with respect to the variable Y may be obtained if the correct bounding values are applied to the taps of potentiometers R–31 and R–32.

Referring to Fig. 2, assume that the value of the variable Z falls between $Z_5$ and $Z_6$, and that the value of the variable Y falls between $Y_2$ and $Y_3$. For any value of the variable X, the value of the function for $Y=Y_2$, $Z=Z_5$ is specified by curve 25; the value of the function for $Y=Y_3$, $Z=Z_5$ by curve 10, and for $Y=Y_3$, $Z=Z_6$ by curve 42. It may be seen that if the two input voltages to the selected taps on potentiometer R–31 of Fig. 1 vary with X as prescribed by curves 10 and 25, and if the two inputs to potentiometer R–32 vary with X as prescribed by curves 42 and 57, the boundary values required for linear interpolation have been established.

To provide the excitation voltages to potentiometers R–31 and R–32 of Fig. 1 it is necessary that a large number of individual functions of the variable X be generated, and the overall accuracy of the output quantity is dependent upon the accuracy with which these functions can be generated. Although the simplest and most straight-forward method of accomplishing the generation of the 64 functions of X might be to provide 64 non-linear potentiometers simultaneously driven by an X-variable servo, it will become apparent that this would be a bulky, costly, and inflexible method. Since the majority of curves representing physical data can be approximated to a high degree of accuracy by the use of a sufficient number of straight-line segments, I have employed this latter method in practising my invention. In Fig. 2 it may be observed that the variable X has been divided into seven bands, and it will be apparent that the bands need not be spaced uniformly. The division of the variable X itno seven finite sectors or bands creates the constants $X_1$ to $X_8$. These constants represent on each curve the value of the variable X at the inflection points of the straight line approximation, and a seven segment straight-line approximation of curve number 1 is shown in dashed lines in Fig. 2. It will be observed that the approximation closely follows the original curve. A similar approximation employing the same X variable band spacing may be applied to each of the remaining 63 curves. In order to approximate the curves as closely as possible, it is desirable that the X sectors be chosen so that the selected values of the X variable lie at or near as many as possible of the points on the 64 curves where the value of the slope or the quantity changes sharply.

Straight line approximations of the curves may be generated by applying appropriate excitation voltages to taps on potentiometers whose sliders are positioned in accordance with the value of the X variable. Since four functions are needed to excite potentiometers R–31 and R–32, four identical ganged X-variable potentiometers may be provided, and these four potentiometers may be excited from many possible voltage sources, but for flexibility, I have chosen to use a tapped voltage divider. Since there are 64 curves in Fig. 2, with 8 possibly diffeernt voltage values per curve, it may be seen that 8 times 64 or 512 taps may be needed on the divider for a three-variable interpolator in which each variable is divided into eight finite increments. By means of switching circuitry to be described, four groups of eight voltages each are connected to the taps of the four X-variable potentiometers. In the example described above, the groups of voltages corresponding to curves 10, 25, 42 and 57 would be connected to the four X-variable potentiometers.

The purpose of the switching circuitry of the invention is to select the appropriate X-variable potentiometer tap excitation voltages and to switch the tap connections to the Y and Z-variable potentiometers. The switching circuitry comprises two sector control relay systems, one system being provided for the Y variable and another very similar sysem being provided for the Z variable. Each sector control relay system contains a number of relays corresponding to the number of finite increments of the associated variable, and for sake of clarity are numbered beginning with the number 1. Thus the sector control relay systems in the apparatus described above will each consist of eight relays numbered 1 through 8. At any instant two adjacent relays in each sector control system will be actuated. If the value of Z falls between $Z_5$ and $Z_6$, the KZ-5 and KZ-6 relays in the Z sector control system will be energized and closed.

Similarly, if Y falls between $Y_2$ and $Y_3$, the KY-2 and KY-3 relays in the Y sector control system will be closed. When the variable crosses one of the sector boundaries, the relays in the sector control system will transfer. For example, assume that the value of the variable Y is steadily increasing, and that at the beginning of the assumption it falls between $Y_2$ and $Y_3$. At the instant that the variable Y becomes equal to $Y_3$, the number 2 relay (KY-2) in the Y sector control system will drop out, and the number 4 relay (KY-4) will close, indicating that the variable Y now falls between values $Y_3$ and $Y_4$.

It is highly desirable in most applications and quite essential in some applications that no discontinuity be introduced into the interpolator output voltage, which necessitates that potentiometer excitation voltages be switched exactly at the instant that the variable crosses the sector boundary. For this reason I have employed an extremely rapid electronic switching circuit, and by novel circuit connections it is insured that no discontinuity will be introduced, since relay transfer occurs at the instant when the interpolator output is determined entirely by the circuitry associated with the relays which are not transferring.

In the illustrated example, at the instant when the Y sector control relay system transferred from relays 2 and 3 closed to relays 3 and 4 closed, the output voltage contributed by the number 2 or number 4 sector circuitry is zero at the instant of the transfer, and the slider of the Y-variable potentiometer would be directly connected to the $Y_3$ voltage.

The data curves illustrated in Fig. 2 (with the exception of $Z_3$) have not crossed one another and have maintained one algebraic sign of output function regardless of the value of the variable. It is to be understood that the curves have been drawn in this manner for simplicity only, and that the invention requires no restrictions upon the algebraic sign of the function nor upon the extent to which the curves cross one another. Furthermore, the number of finite increments of the variable X may be increased or decreased if necessary to increase or decrease the accuracy of reproduction of the empirical data. In practicing the invention extensive use has been made of interpolators having eight discrete values of the variable X.

In general, the spacing between the X, Y and Z finite increments would not be uniform, and hence the tapped potentiometers for the different variables would not be the same. It is highly desirable for reasons of component standardization that such potentiometers be identical if possible, and I have accomplished such standardization by making the rotation of the X, Y and Z variable shafts which drive these potentiometers non-linear with respect to the variables themselves. Such a non-linear relationship may be established through the use of tapped follow-up potentiometers on the X, Y and Z servos. These tapped follow-up potentiometers may be identical to the tapped potentiometers employed in the interpolation circuits, and hence all potentiometers employed in the invention may be identical units with uniform tap spacing. By suitable adjustment of the follow-up potentiometer tap excitation, the X, Y and Z servos may be caused to rotate so that the slider positions will exactly coincide with corresponding tap locations.

In practising my invention, apparatus may be connected to generate functions of more or less than three variables. If it be desired to generate a function of two variables, the Z-variable potentiometer and associated control circuitry may be eliminated. Furthermore, amplifier U-22 and potentiometer R-32 of Fig. 1 could be eliminated, since the output of the two-variable apparatus could be taken directly from the slider of potentiometer R-31. In this case only two of the X curves would be generated simultaneously, employing two X-variable potentiometers. Similarly, the system can be extended to a function of four variables employing eight U-variable potentiometers, four X-variable potentiometers, two V-variable potentiometers, and one Z-variable potentiometer. In this instance it will be necessary to generate eight functions of the variable U simultaneously. The number of variables can be extended without limit, with the number of potentiometers required on each variable shaft being progressive powers of the base two. Thus a six-variable apparatus requires 1, 2, 4, 8, 16 and 32 potentiometers respectively on the six independent variable shafts.

Figure 3:
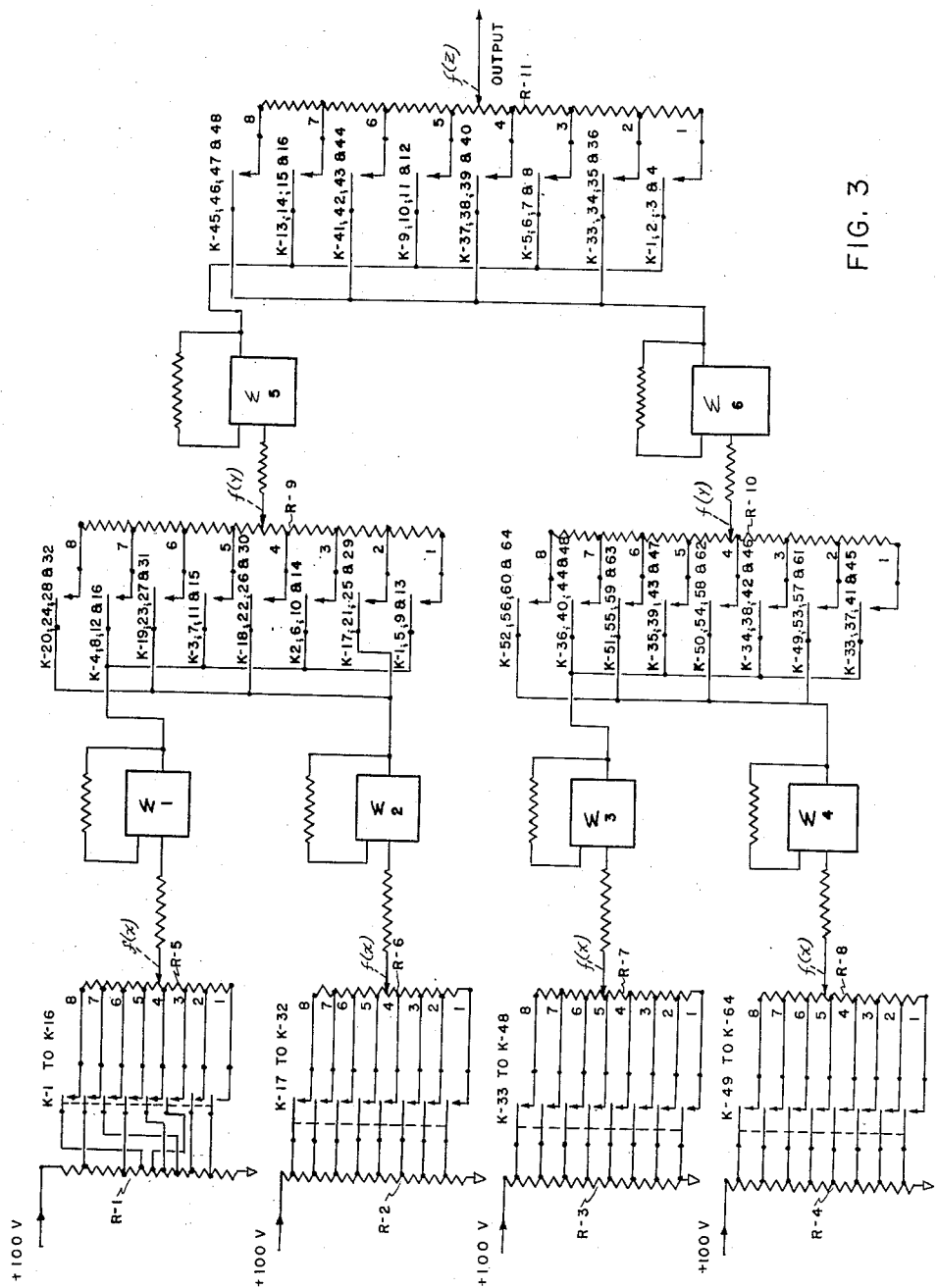
Fig. 3 is an electrical schematic diagram showing the basic interpolation circuits of a three-variable form of the invention.

Referring to Fig. 3 there is shown a simplified schematic of a portion of a three-variable interpolator constructed according to the invention. In Fig. 3 voltage dividers R-1, R-2, R-3 and R-4 having a large number of adjustable taps and a winding several feet in overall length are provided. The winding of each voltage divider is shown connected across a positive 100 volts and ground voltage supply, but it will be apparent that the dividers may be provided with constant excitation of any magnitude or polarity compatible with the required voltges at the individual taps.

In the illustrated example, it has been assumed that the value of the output function is specified at eight discrete values of each of three variables, and that hence 512 different excitation voltages may be needed. If four voltage dividers such as R-1, R-2, R-3 and R-4 are utilized, it will be apparent that there must be at least 128 taps on each divider. It will be apparent that instead of using four dividers having 128 taps each, one may utilize a single voltage divider having 512 taps. It will also be apparent that the "taps" on the voltage dividers need not be actual soldered and fixed terminals, but may be mere positions which sliding adjustable contacts may make. In order that data may be reproduced in which the curves cross, it is desirable that the voltage dividers be such that several taps may be adjusted to the same point, in case the curves cross at one of the finite value points.

In Fig. 3 potentiometers R-5, R-6, R-7 and R-8 are ganged together and are driven by a shaft representing the value of the variable X. Potentiometers R-9 and R-10 are ganged together and driven in accordance with variable Y, while potentiometer R-11 is positioned in accordance with variable Z. As mentioned above, it is desirable that all the potentiometers of Fig. 3 be identical and have uniformly spaced taps dividing each potentiometer into seven equal rotational sectors. Since each of the tap points on the potentiometers represents one of the values of the corresponding variable at which the output function is specified, and since, in general these points are not spaced at uniform increments of the variables, it is apparent that if uniformly spaced potentiometer taps are to be employed, it will be necessary that the potentiometer shaft rotations be non-linear with respect to the three independent variables as will be further explained below.

Associated with each voltage divider (R-1 through R-4) is a bank of 16 telephone-type relays, each relay having 12 "form A" (single-pole, single-throw, normally-open) contacts. The relays which connect voltage divider R-1 to potentiometer R-5 are numbered K-1 to K-16; the relays which connect voltage divider R-2 to potentiometer R-6 are numbered K-17 to K-32; the relays which connect voltage divider R-3 to potentiometer R-7 are numbered K-33 to K-48; and the relays which connect voltage divider R-4 to potentiometer R-8 are numbered K-49 to K-64. The purpose of these relays is to connect the correct taps of the voltage dividers to the correct taps on the potentiometer. At any one instant one of the sixteen relays in each of the four groups is actuated, connecting the eight taps of each of potentiometers R-5 through R-8 to eight particular taps on each of voltage dividers R–1 through R–4 respectively. In Fig. 3 the relay sections whose moving contacts are connected together by dashed lines represent eight of the twelve available sections of a single relay which transfer simultaneously. For sake of clarity, the contacts of only one of the sixteen relays has been shown in Fig. 3. The remaining 15 relays in each group are connected with their fixed contacts in parallel with the fixed contacts indicated in Fig. 3 and with their movable contacts connected to different voltage divider taps. Hence it may be seen that energization of relay K–1 may set up a potential distribution on potentiometer R–5 in accordance with curve 1 of Fig. 2, energization of relay K–17 will set up a potential distribution on potentiometer R–6 in accordance with curve 17 of Fig. 2, etc.

When one of the relays is energized to connect a set of potentials to one of the X-variable potentiometers, the open-circuit potentials at the voltage divider taps may be altered because of the loading effect of the X-variable potentiometer, and to maintain this loading effect at a minimum, it is recommended that the X-variable potentiometers have a resistance of more than ten times that of its associated voltage divider. Typical values which have given good results are 3000 ohms for the voltage dividers and 100,000 ohms for the X-variable potentiometers. Since I have employed four separate voltage dividers, no more than one potentiometer is connected across each voltage divider at any one time, and hence adjustment of the voltage divider taps not in use at a given instant does not effect the voltages supplied to the tapped potentiometers. However, when presently active taps are adjusted, the loading effect resulting from current flow in the X-variable potentiometer causes interaction, and any adjustment made to the voltage to a particular tap on the X-variable potentiometer will vary slightly the voltage at the other taps on the potentiometer. This interaction effect is quite modest in magnitude however, and a slight re-adjustment of the taps at the voltage dividers will allow the correct potential distribution to be effected across the X-variable potentiometers. It is important to notice that adjustment of the tap settings for one set of values has no effect upon the tap settings for the remaining fifteen sets of values in apparatus utilizing separate voltage dividers as shown, and hence a minimum amount of re-iterative adjustment is required.

Although voltage dividers R–2, R–3 and R–4 have been shown with ascending voltage points connected to higher tap numbers, it is to be understood that the voltage need not rise or fall continuously with rotation of the X-variable shafts. Cross connections are shown from voltage divider R–1 to X-variable potentiometer R–5 to illustrate a typical application. The maximum change in the output between two discrete values of the X variable will determine the maximum voltage gradient applied across any section of any of the X variable potentiometers, and it is to be understood that the wattage rating of the potentiometer must be chosen with the maximum voltage gradient in mind.

The output voltages of feedback amplifiers U–1, U–2, U–3, and U–4 are connected through relay contacts to the taps on potentiometers R–9 and R–10, the sliders of which are positioned in accordance with the Y variable. Unlike the tap connections of the X-variable potentiometers, the taps on Y-variable potentiometers R–9 and R–10 are not connected to ganged contacts of a single relay, but are instead excited by individual relay contacts. Shown in Fig. 3 connecting the outputs of each of the amplifiers to one of the Y-variable potentiometers is a relay contact, which actually represents four independent relay contacts in parallel. For example, tap number 8 of potentiometer R–9 connects to the feedback amplifier output through a contact of any one of relays K–20, K–24, K–28 or K–32. As will be shown later, only one of these contacts will be closed at any one instant.

The output voltages of feedback amplifiers U–3 and U–4 connect through similar circuitry to potentiometer R–10. It may be observed that of the 64 relays utilized to switch voltages from the voltage dividers (R–1 through R–4) to the X-variable potentiometers (R–5 through R–8), contacts on 32 of these relays are employed to switch excitation voltages to potentiometer R–9, while contacts on the remaining 32 are employed to connect excitation voltages to potentiometer R–10. The output voltages of potentiometers R–9 and R–10 are fed through feedback amplifiers U–5 and U–6 and through relay contacts to excite Z-variable potentiometer R–11. Potentiometer R–11 may be identical to the other potentiometers shown in Fig. 3, but is rotated by a servo positioned by the Z-variable. The taps on potentiometer R–11 are connected to the outputs of feedback amplifiers U–5 and U–6 through relay contacts, two adjacent taps being connected at any one instant. As before, a single relay contact has been utilized for sake of clarity to represent a plurality of independent relay contacts wired in parallel. Thus tap number 8 of potentiometer R–11 is connected to the output circuit of feedback amplifier U–6 through contacts on relays K–45, K–46, K–47 or K–48. No more than one of these four contacts will be closed at any one instant. It may be noted that 32 relay contacts are employed to connect the output voltages of amplifiers U–5 and U–6 to the taps on potentiometer R–11. The 32 contacts may be located on the 12-pole relays mentioned above which switch excitation voltages to potentiometers R–5 and R–7. It may be noted that no additional relay contacts are required on the 12-pole relays which switch excitation to potentiometers R–6 and R–8. For purposes of symmetry, however, it may be deemed preferable to provide the unused extra contacts on the latter relays, thereby making the circuit wiring of the four groups identical.

Figure 4:
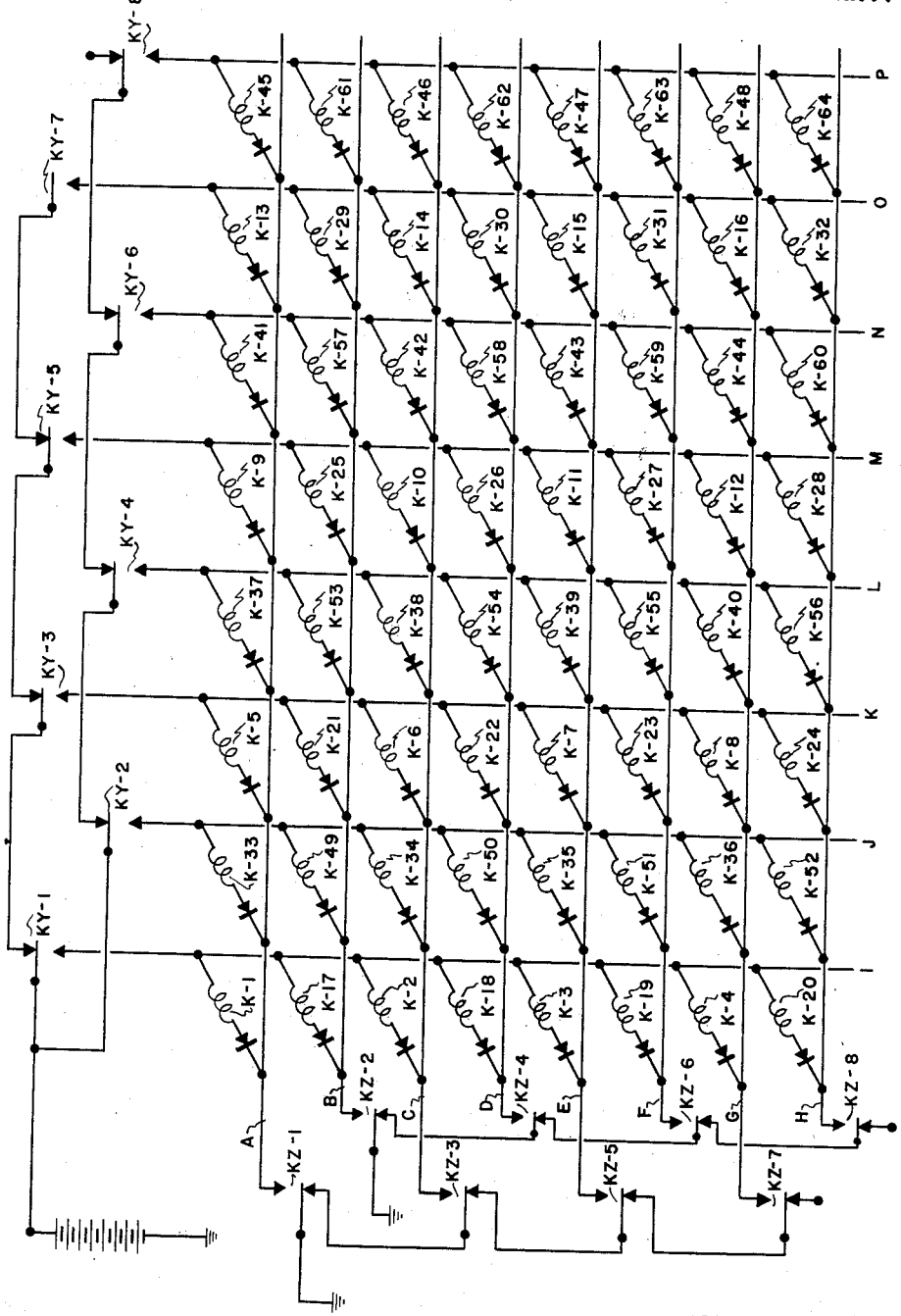
Fig. 4 is an electrical schematic diagram showing the switching matrix portion of a three-variable form of the invention.

Referring to Fig. 4 there is shown schematically the circuit wiring for the operating coils of relays K–1 to K–64 inclusive. For sake of clarity, relay contacts have been shown in Fig. 3 and relay control coils in Fig. 4. Reference to Fig. 4 discloses that the 64 relay coils are connected to a matrix comprised of eight horizontal buses (A to H) and eight vertical buses (I to P). It may be noted that only one relay is connected between a particular vertical and a particular horizontal bus. Thus if a control voltage (which may be 28 volts D.C. if standard telephone relays are used) is applied between one of the horizontal bars and one of the vertical bars, one of the 64 relays will be energized and actuated. Furthermore, if more than one horizontal or vertical bus is energized simultaneously, all of the relays associated with the group of excited bus bars will be energized. For example, if control voltage is applied to vertical bars I and J, and horizontal bars G and H are grounded, relays K–4, K–36, K–20 and K–52 would close. In actual operation of the interpolator relay matrix, four of the 64 relays are closed simultaneously. In order to prevent the creation of back circuits resulting from reverse current flow through the unused relays, small selenium rectifiers may be connected in series with the relay coils as shown in Fig. 4.

Reference to Figs. 3 and 4 will indicate that relays K–1 to K–16 are connected to horizontal buses A, C, E and G, and to vertical buses I, K, M and O. Relays K–17 to K–32 are connected to horizontal buses B, D, F and H and to vertical buses I, K, M and O. Relays K–33 to K–48 are connected to horizontal buses A, C, E and G and to vertical buses J, L, N and P. Relays K–49 to K–64 are connected to horizontal buses B, D, F and H and to vertical buses J, L, N and P. In operation of the invention, two adjacent buses of both the horizontal and vertical groups will be excited. As the individual sixteen-relay groups are connected to alternate buses in the vertical and horizontal arrays, it may be determined that one relay in each sixteen relay group will close at any one instant. The relays which control the electrical connections to the eight vertical and eight horizontal bus bars are so interconnected that it is impossible for more than two horizontal bus bars and two vertical bus bars to be excited simultaneously. For this reason it is impossible during normal operation of the apparatus for more than one control relay in any of the four 16-relay groups to close.

Referring to Fig. 6 there is shown a schematic diagram partially in block form of the complete apparatus of a three-variable form of the invention. Like symbols refer to like parts in Figs. 3–6, and it will become apparent that the output voltage at terminal E will represent the correct function of the X, Y and Z variables if relays K–1 to K–64 are appropriately actuated. In Fig. 6 the X-variable potentiometers R–5 to R–8 are positioned by a servomotor M—X in accordance with the X-variable input to servoamplifier U–7. The follow-up potentiometer may comprise a potentiometer having a non-linearity in accordance with the irregularity of spacing of the X variable increments, but for reasons of component standardization as mentioned above, I chose to derive re-balancing voltage for servomotor M—X from a linear potentiometer R—X having equi-spaced taps which are excited non-linearly from voltage divider R–12 in accordance with the spacing of the finite X-variable points. The Y-variable potentiometers R–9 and R–10 are positioned similarly by servomotor M—Y in accordance with the Y-variable input to servoamplifier U–8, and the Z-variable potentiometer R–11 is positioned by servomotor M—Z in accordance with the Z-variable input voltage applied to servoamplifier U–9. Follow-up potentiometers R—Y and R—Z also comprise linear potentiometers having equi-spaced taps excited from voltage dividers R–13 and R–14, respectively, in accordance with the spacings of the finite increments selected for the Y and Z variables. If desired, voltage dividers R–12, R–13 and R–14 may be replaced by a single voltage divider having a suitable number of taps.

Shown in block diagram form at MX in Fig. 6 is the switching matrix MX which selectively actuates relays K–1 to K–64 to operate the interpolator. Matrix MX is actuated by energizing various of its conductors or buses and grounding various others, as explained above in connection with Fig. 4. Which conductors are grounded and which are energized at any particular instant are determined by Y sector control relays KY–1 to KY–8 and by Z sector control relays KZ–1 to KZ–8. Selection of the Y and Z sector control relays is controlled by polarity detector systems. Polarity detector system PDY receives input voltages in accordance with the instantaneous value of the Y-variable and in accordance with the adjacent upper and lower finite increment of the Y variable, compares these voltages, and actuates the Y sector control relays KY–1 to KY–8 accordingly. Polarity detector system PDZ receives input voltages in accordance with the instantaneous value of the Z variable and in accordance with the adjacent upper and lower selected finite increments of the Z variable, compares these voltages, and actuates the Z sector control relays KZ–1 to KZ–8 accordingly.

Referring to Fig. 5 there is shown in detail the polarity detector system and sector control system for the Y variable. The purpose of the sector control relay systems is to divide the range of the Y and Z variables into seven discrete bands or sectors. Assume that the value of the Y variable input to servoamplifier U–8 is greater (more positive) than $Y_4$ but less than $Y_5$. Servomotor M—Y will drive follow-up potentiometer R—Y to a position between its $Y_4$ and $Y_5$ taps, and will position potentiometers R–9 and R–10 to positions between their Y–4 and Y–5 taps. Assume for the moment that relays KY–4 and KY–5 are energized, so that the $Y_4$ and $Y_5$ voltages from follow-up potentiometer R—Y are applied to the input circuits of polarity detector circuits PDYE and PDYO. Each of the polarity detector circuits comprise an electronic amplifier and a sensitive, fast-acting relay arranged so that if the sum total voltage input to the amplifier is positive the relay will close. Thusly, if the Y variable input voltage is applied to each amplifier, and the $Y_4$ and $Y_5$ voltages from follow-up potentiometer R—Y are also applied to the amplifiers, relay KYE will remain deenergized and relay KYO will be energized. Direct voltage is therefore applied to the coil of relay KY–4 through the normally closed contacts "a" of KYO and KY–7 and the transferred contact of relay KY–5. Direct voltage is also applied through the normally open contact "b" of relay KYE, through a normally closed contact "a" of relay KY–2 and through the transferred contact of relay KY–4 to energize the coil of relay KY–5. When relay KY–4 is closed, a relay KY–4 holding contact "c" maintains relay KY–4 closed through normally closed contacts "c" of relays KY–2 and KY–6, so that relay KY–4 will remain closed until either relay KY–2 or relay KY–6 is energized. When relay KY–5 is closed, a relay KY–5 holding contact "c" maintains relay KY–5 closed through normally closed contacts "c" of relays KY–3 and KY–7, so that relay KY–5 will remain closed until either relay KY–3 or KY–7 is energized. Thus it may be seen that only one even-numbered KY relay and one odd-numbered KY relay may be closed at one time. Each of the KY relays is wired according to the same scheme, so that any even-numbered KY relay will hold until an adjacent even-numbered KY relay is energized, and any odd-numbered K—Y relay will hold until an adjacent odd-numbered KY relay is energized.

Assume as above that the magnitude of the Y variable lies between the limits of $Y_4$ and $Y_5$, and that the magnitude of the Z variable lies between $Z_4$ and $Z_5$. As described above relays KY–4 and KY–5 will be energized. An identical switching system connected to the Z follow-up potentiometer R—Z and the Z input voltage operates in the same manner as that described above to close relays KZ–4 and KZ–5, the Z-variable counterparts of relays KY–4 and KY–5. Referring now to Fig. 4, it will be understood how matrix MX is energized to close the appropriate relays of the 64 relay group. Closure of relays KY–4 and KY–5 connects buses L and M to direct voltage, and closure of relays KZ–4 and KZ–5 connects buses D and E to ground. It will be apparent that relays K–11, K–26, K–39 and K–54 are thereby energized. Potential distributions in accordance with curves 11, 26, 39, and 54 are thereby applied across potentiometers R–5 to R–8. The sliders of these potentiometers pick off voltages corresponding to the ordinates of these curves at the particular instantaneous value of X variable and apply them via the feedback amplifiers to potentiometers R–9 and R–10. As may be seen by reference to Fig. 3, closure of relays K–11 and K–26 connects the voltages of curves 11 and 26 to taps 4 and 5 of potentiometer R–9, and closure of relays K–39 and K–54 connects the voltages of curves 39 and 54 to potentiometer R–10. The sliders of potentiometers R–9 and R–10 thereby receive voltages which are linear interpolations between curves 11 and 26 and between curves 39 and 54. Such voltages are applied via the feedback amplifiers to potentiometer R–11. It will be seen that closure of relay K–11 and relay K–39 will connect the voltages to taps 4 and 5 of potentiometer R–11. The slider of potentiometer R–11 then interpolates between the voltages at taps 4 and 5 and hence delivers an output voltage which is the desired quantity.

Now assume that the value of the X-variable input is altered. Servomotor M—X will move the sliders of potentiometers R–5 to R–8 along their windings, which in effect will derive voltages corresponding to different ordinates of the same curves, 11, 26, 39 and 54. No relays will be switched. But if the value of the Y input or the Z input variable is changed, relays will be switched to provide proper function generation. Assume that the value of the Y variable is increased from between $Y_4$ and $Y_5$ to a value between $Y_5$ and $Y_6$. As the value of the Y variable reaches $Y_5$, the positive voltage to polarity detector PDYO from the Y variable input circuit will equal and then begin to exceed the negative reference $Y_5$ voltage applied to via the closed contact of relay KY-5, making the total voltage input to PDYO positive, thereby energizing the coil of relay KYO. Through the normally open contact "b" on relay KYO, the normally closed contacts "b" on relays KY-1 and KY-3 and the normally-open but transferred contact "b" on relay KY-5 the coil of relay KY-6 will be energized. When this occurs, a number of actions will take place simultaneously. The holding voltage on relay KY-4 will be broken by the opening of contact "c" of relay KY-6, causing relay KY-4 to drop out. It will be seen that polarity detector PDYE now has its reference voltage input switched from tap 4 of potentiometer R—Y to tap 6, applying negative $Y_6$ voltage to polarity detector PDYE sufficient to cause relay KYE to release, since the Y voltage input will be less than the reference voltage at tap 6. With KYE released, direct voltage is applied through the normally closed contact "a" of relay KY-8 and the transferred contact "d" of relay KY-6 to the coil of relay KY-5, and hence relay KY-5 remains energized until either relay KY-3 or KY-7 is energized. The values of the constants $Y_1$ to $Y_8$ and $Z_1$ to $Z_8$ are established by the nature of the data to be reproduced or generated as explained above. The polarity detectors are each conventional electronic amplifiers associated with a rectifier and a sensitive relay. When the algebraic sum of all the voltage inputs to a polarity detector is positive, the relay in the output circuit of the polarity is energized and actuated.

In Fig. 5, polarity detector PDYE is associated with even-numbered increments ($Y_2$, $Y_4$, $Y_6$, $Y_8$), and polarity detector PDYO is associated with odd-numbered increments ($Y_1$, $Y_3$, $Y_5$, $Y_7$). Similarly, relays KY-1 to KY-8 are divided into an even-numbered group (KY-2, KY-4, KY-6, KY-8) and an odd-numbered group (KY-1, KY-3, KY-5, KY-7). It may be seen that the contacts on relays KY-1, KY-3, KY-5 and KY-7 determine the reference voltage level applied to the odd polarity detector PDYO, and contacts on relays KY-2, KY-4, KY-6 and KY-8 determine the reference voltage applied to even polarity detector PDYE. In addition to the reference voltage and the input signal of opposite sign, a third input voltage small in magnitude may be applied to the input of each polarity detector as a small "bias" to produce a hysteresis effect in the operation of the polarity detectors. Such a biasing voltage eliminates any tendency for the relays to chatter when an input voltage exactly equal in magnitude to the reference voltage is being applied to the polarity detector.

The operation of the Y control system throughout the entire voltage range may be analyzed in similar manner, and it will be seen that as the values of the Y variable input voltage vary, the Y control system will operate to energize the proper vertical buses of relay matrix MX. The Z control system operates identically to ground the proper buses of relay matrix MX. It will be seen that the control systems cannot get out of synchronism and are self-starting after power failure. For example, if all KY relays are de-energized and a Y voltage input between $Y_4$ and $Y_5$ is applied, the odd and even KY relays will be energized in rapid succession until relays KY-4 and KY-5 are both closed.

In order for the relay systems to operate correctly, it is necessary that polarity detector relays KYO and KYE operate rapidly with respect to relays KY-1 to KY-8. For this reason copper slug type telephone relays with a time delay of approximately 100 milliseconds have been employed for relays KY-1 to KY-8. The Z system has been similarly equipped.

Since the reference voltages employed in the Y and Z variable systems are identical to the voltages required for excitation of the K—Y and K—Z follow-up potentiometers, both voltages in each system are supplied from the same voltage dividers, R-13 and R-14. It will be apparent that separate voltage dividers may be provided, if desired. It will be apparent that the invention may be utilized with mechanical shaft inputs for the independent variables instead of electrical inputs to the servos shown. However, if the servos are eliminated, the interpolating potentiometers will have to be positioned non-linearly by other means if uniform tap spacing is to be maintained.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Voltage function generating apparatus comprising voltage divider means having taps settable in accordance with selected ordinates of a plurality of plots of a quantity as a function of a first input variable at selected discrete values of a second and a third variable, relay means operable in response to the value of applied input voltages representing said second and third variables for applying potential distributions representing plots of said quantity with respect to said first variable at certain of said selected values of said second and third variables across selected taps of two pairs of first-variable potentiometers, each of said first-variable potentiometers having a selector positioned in accordance with the value of said first variable to derive at said selectors pairs of second potentials representing linear interpolations between pairs of said plots, circuit means for applying each of said pairs of second-potentials to a pair of adjacent taps of each of a pair of second-variable potentiometers, said second-variable potentiometers having selectors positioned in accordance with said second input variable for deriving a pair of third potentials representing linear interpolations between pairs of said second potentials, second circuit means for applying said third potentials to selected taps of a third-variable potentiometer, said third-variable potentiometer having a selector positioned in accordance with the value of said third variable for deriving an output voltage as a function of the three variables.

2. Voltage function generating apparatus comprising voltage divider means having a plurality of taps settable in accordance with tabulated data, first circuit means including relay contacts for applying voltages from selected taps to selected terminals of four X-variable potentiometers, second circuit means comprising relay contacts and circuit isolation means for applying voltages from the sliders of each of said four X-variable potentiometers to selected taps of two Y-variable potentiometers, third circuit means including relay contacts and circuit isolation means for applying voltages from the sliders of each of said Y-variable potentiometers to selected taps of a Z-variable potentiometer, said Z-variable potentiometer having a slider to produce an output quantity as a function of said X, Y and Z variables.

3. Apparatus as in claim 2 in which the relay contacts are operated in response to the instantaneous values of the Y-variable and the Z-variable.

4. Voltage function generating apparatus comprising voltage divider means having a plurality of taps settable in accordance with discrete values of empirical data, $2^n - 1$ potentiometers arranged in $n$ groups according to progressive powers of the base two, the sliders of each potentiometer of a group being positioned in accordance with the instantaneous value of one of $n$ independent variables, the windings of the highest order group being connected to said voltage divider means, the sliders of each intermediate group being connected through circuit isolation means to the windings of its adjacent lower order group, and the slider of the lowest order potentiometer forming an output terminal, relay means responsive to the value of a plurality of said independent variables for connecting certain taps of said voltage divider means to certain taps of said highest order potentiometer group and for connecting the sliders of each of the highest and intermediate groups through circuit isolation means to selected taps of the windings of the potentiometers of the adjacent lower order group.

5. Voltage function generating apparatus having $2^n-1$ potentiometers cascaded in $n$ groups in accordance with progressive powers of the base two, voltage divider means having a plurality of taps settable in accordance with discrete values of a quantity expressed as a function of a first independent variable at predetermined adjustable finite values of $2 \ldots n$ independent variables, first circuit means operable to connect certain taps of said voltage divider means to the largest group of potentiometers to apply potential distributions across each potentiometer of said group approximating proportionally said quantity at upper and lower finite values of said $2 \ldots n$ independent variables, second circuit means including circuit isolation means connecting the sliders of each of said potentiometers of said group to two taps of a potentiometer of the adjacent lower order group, the two taps of each lower order potentiometer representing predetermined upper and lower boundaries of the independent variable associated with each group, the sliders of each group of potentiometers being positioned in accordance with the instantaneous values of $n$ independent variable input voltages, polarity detecting means individual to each of said lower order groups for comparing the value of each independent variable input voltage with the voltage at the said two taps, and a switching relay matrix responsive to each of said polarity detecting means for operating said first and second circuit means to connect potentials to the taps of said potentiometers in accordance with the instantaneous values of said independent variable input voltages.

6. Voltage function generating apparatus comprising a potentiometer having a plurality of taps spaced in accordance with predetermined values of a first independent variable and a slider movably positioned in accordance with instantaneous values of said independent variable, means for applying voltages to the pair of taps between which the slider is positioned in accordance with the value of a quantity at two predetermined discrete values representing a finite increment of said independent variable, polarity detecting means connected to compare the value of a voltage representing said independent variable with the voltages at said pair of taps and operable to apply voltages representing different increments of said independent variable as said slider is positioned between different pairs of said taps.

7. Function generating apparatus comprising a potentiometer having a plurality of equi-spaced taps and a slider movable non-linearly in accordance with the value of a first independent variable having a plurality of predetermined and unequal increments; means for applying potentials to the pair of taps adjacent said slider in accordance with the values of a quantity at two predetermined discrete values bounding finite increments of said independent variable comprising means for deriving boundary voltages commensurate with each discrete value, means for deriving a voltage commensurate with the instantaneous value of said independent variable, means operable to compare said voltages and to switch said potentials selectively to different pairs of said taps as said slider is moved, said slider being positioned in accordance with said independent variable with a non-linearity corresponding to the unequality of said increments.

8. Voltage generating and interpolating apparatus comprising a potentiometer having a plurality of taps and a slider movable in response to an independent variable shaft input, means for deriving potentials commensurate with discrete values of a quantity expressed as a function of said independent variable, circuit means for applying two of said potentials to the two of said taps instantaneously adjacent said slider, and switching means responsive to said independent variable shaft input and said two potentials for selectively disconnecting the potential from a first of said two adjacent taps and connecting a potential to a third tap adjacent the second of said two taps as said slider traverses said second of said taps.

9. Function generating and interpolating apparatus comprising a potentiometer having a plurality of taps corresponding to discrete values of an independent variable and a slider movable in response to said variable, means for deriving voltages in accordance with empirical or tabulated values of a quantity at said discrete values of said variable, and relay switching means for applying said voltages to said taps, said relay switching means comprising polarity detector means responsive to said independent variable and said voltages and operable to apply to a pair of said taps a pair of said voltages representing the value of said quantity at the discrete values of said variable immediately above and immediately below the instantaneous value of said independent variable.

10. Voltage function generating apparatus comprising in combination four substantially identical potentiometers each having a plurality of equi-spaced taps and each having a wiper arm positioned by a first servo, a first plurality of relays operable to connect predetermined voltages to the taps of said potentiometers, two adjacent taps of each potentiometer being supplied with potentials at any one instant, said first servo being responsive to a first input potential commensurate with the value of a first independent variable $x$, said wiper arms of a first pair of said four potentiometers each being connected through isolating means and relay contacts to adjacent taps of a fifth tapped potentiometer, said wiper arms of a second pair of said four potentiometers each being connected through isolating means and relay contacts to adjacent taps of a sixth tapped potentiometer, said fifth and sixth potentiometer having wiper arms connected through isolating means and relay contacts to a pair of adjacent taps of a seventh tapped potentiometer, said wiper arms of said fifth and sixth potentiometers each being positioned by a second servo responsive to a second input potential commensurate with the value of a second independent variable, and a third servo responsive to a third input potential commensurate with the value of a third independent variable for positioning the wiper arm of said seventh potentiometer to provide an output potential.

11. Voltage function generating apparatus comprising in combination a first potentiometer having a plurality of taps and a wiper arm positioned by a first servo, said first servo being responsive to a first input signal commensurate with the value of a first independent variable, relay means responsive to said first input signal to apply two potentials to two individual adjacent taps of said first potentiometer; and means for deriving said two potentials comprising second and third potentiometers each having a plurality of taps excited by various potentials and a wiper arm positioned by a second servo responsive to a second input signal commensurate with the value of a second independent variable.

12. Apparatus according to claim 11 in which said relay means comprises a plurality of relay contacts each operable to connect one of said two potentials through a buffer device to a different tap of said first potentiometer, and means responsive to said first input signal to operate said relay contacts selectively to apply said two potentials to individual adjacent taps of said first potentiometer.

13. Interpolating voltage function generating apparatus comprising in combination a first potentiometer having a winding with a plurality of taps and a slider movable along said winding by a servo, said servo being connected to receive an input potential commensurate with the value of a first independent variable and a follow-up potential from a follow-up potentiometer, said follow-up potentiometer having a plurality of taps excited with selected potentials representing discrete values of said first independent variable, a plurality of relays each operable upon actuation to connect a potential via a buffer device to one of said taps of said first potentiometer, and polarity detection means to compare said input potential with said selected potentials and to actuate two of said relays to apply two potentials via two buffer devices to the two adjacent taps of said first potentiometer between which said servo positions said slider.

14. Interpolating voltage function generating apparatus comprising in combination a first potentiometer having a winding with a plurality of taps and a slider movable along said winding by means of a mechanical input commensurate with the value of an independent variable, a second potentiometer having a winding with a plurality of taps and a slider movable along said winding in accordance with said variable, means for connecting a plurality of selected potentials representing discrete values of said variable to said taps of said second potentiometer, means for deriving an input potential commensurate with said variable, comparison means to compare said input potential with said selected potentials, and means responsive to said comparison means to connect potentials to two adjacent taps of said first potentiometer between which said slider arm of said first potentiometer is positioned.

15. Function generating apparatus comprising in combination a potentiometer having a plurality of taps and an arm movable in response to an independent variable, means for deriving potentials commensurate with discrete values of a quantity varying as a function of said independent variable, said discrete values of said quantity corresponding to the spacing of said taps on said potentiometer, means for comparing the voltage on said arm with a plurality of said derived potentials to select those of said potentials bounding said voltage on said arm, and relay means responsive to said comparing means for applying selected ones of the derived potentials to taps on each side of the instantaneous position of said wiper arm as said arm is moved in response to changes in said independent variable.

References Cited in the file of this patent
UNITED STATES PATENTS

| | | |
|---|---|---|
| 2,428,811 | Rajchman | Oct. 14, 1947 |
| 2,575,545 | Walker | Oct. 23, 1951 |
| 2,617,587 | Carpenter | Nov. 11, 1952 |
| 2,662,147 | Wilentchik | Dec. 8, 1953 |
| 2,774,934 | Gitzendanner | Dec. 18, 1956 |

OTHER REFERENCES

Korn, G. A.: "Design and Construction of Universal Function Generating Potentiometers," Review of Scientific Instruments, vol. 21, No. 1, January 1950, pp. 77–81.

Levenstein, Harold: "Generating Nonlinear Functions With Linear Potentiometers," Tele-Tech and Electronic Industries, October 1953, pp. 76–78.

Electronic Instruments (Greenwood et al.), 1948, pages 90–128.